March 12, 1957  H. FUCHS  2,785,323
METHOD AND MEANS FOR ACTUATING A ROTATABLE ELEMENT
Filed Sept. 22, 1952
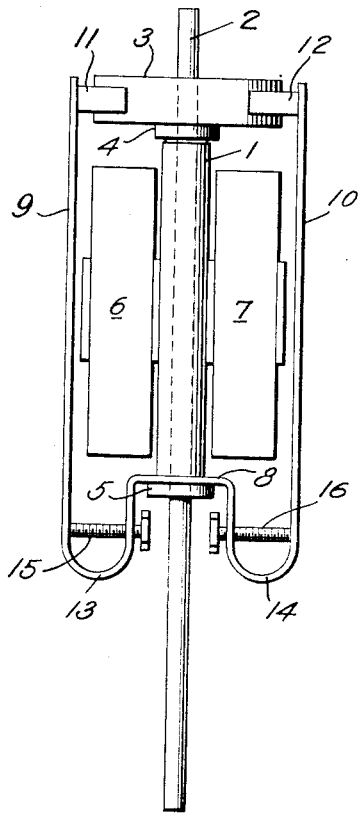
INVENTOR

United States Patent Office 2,785,323
Patented Mar. 12, 1957

2,785,323

METHOD AND MEANS FOR ACTUATING A ROTATABLE ELEMENT

Harry Fuchs, Jamaica, N. Y.

Application September 22, 1952, Serial No. 310,846

6 Claims. (Cl. 310—22)

My invention relates to the method and means for actuating a rotatable element and is an improvement on the device in my Patent No. 2,043,744 issued June 9, 1936. More particularly my invention relates to an impulse motor involving a new concept wherein a pulse of electric current generates a pulse of magnetic or equivalent power flux which actuates a vibratable element to move a rotatable element and simultaneously dampens the said rotatable element to substantially prevent overshooting and provide a stabilizing action without the use of auxilliary braking devices and systems as have been necessary heretofore.

The principal object of my invention is to provide a simple, compact, and easily manufactured device having a minimum of parts and numerous applications in many different fields.

Other objects of my invention will appear hereinafter and within the scope of the appended claims and equivalents thereof.

My invention accordingly consists in the method, combinations of elements, arrangements of parts, and in the several steps and relation and order of each of the same to one or more of the others as will be disclosed hereinafter. The many novel features embraced in my invention are far-reaching in their scope and are applicable in many embodiments other than described herein, and I therefore do not wish to be limited except as indicated in the appended claims and equivalents thereof.

The single figure of the drawing embodies an application of my invention.

Referring to the drawing, the support 1, which may be magnetizable, has a bearing in which is adapted to rotate the longitudinally extensive rotatable element 2 having a part thereof in the form of a disc indicated by 3. 4 and 5 are lubricant-impregnated hard felt collars wedged on the rotatable element 2 in the positions shown to maintain rotatable element 2 in proper position. Electroresponsive devices as for example the electromagnets 6 and 7 are secured to the support 1 at opposite sides thereof, and it will be understood that electroresponsive devices of ceramics such as barium titanate or of crystals such as Rochelle salts may be substituted therefor.

The U-shaped bracket 8 is fastened at its mid-portion to the support 1 by suitable means such as riveting or welding and each of the arms thereof termed the vibratable elements 9 and 10 is adapted to be vibrated by its respective adjacent electromagnet upon the energization of the said electromagnet by an alternating or pulsating electric current.

A flexible pawl 11 of metal or rubber secured at the extremity of vibratable element 9 is adapted to intermittently engage and rotate disc 3 in one direction when vibratable element 9 is actuated by electromagnet 6, and flexible pawl 12 secured at the extremity of vibratable element 10 is adapted to intermittently engage and rotate disc 3 in the opposite direction when vibratable element 10 is actuated by electromagnet 7, each of the said pawls being adjusted to tangentially engage the surface of disc 3 in the manner well known to artisans. The surface of disc 3 may be knurled or surfaced with rubber. Instead of pawls 11 and 12 I have also used permanent magnets at the extremities of the vibratable elements to actuate a disc 3 made of magnetizable material without the permanent magnets coming into physical contact with the said disc 3.

13 and 14 indicate open loops formed in the bottom of the U-shaped bracket 8; one end of loop 13 being secured to support 1 and the other end thereof being integral with vibratable element 9, while one end of loop 14 is secured to support 1 and the other end thereof is integral with vibratable element 10. I have also made angular bends instead of loops.

Screw 15 threaded through one side of loop 13 bears against the other side of the loop coextensive with vibratable element 9 and is adapted to be adjusted for varying the spacing between electromagnet 6 and vibratable element 9; and screw 16 threaded through one side of loop 14 bears against the other side of the loop coextensive with vibratable element 10 and is adapted to be adjusted for varying the spacing between electromagnet 7 and vibratable element 10. Each of the screws 15 and 16 has an angular part such as a hexagon head to facilitate the adjustment of its respective vibratable element to a point of maximum efficiency as related to its actuating electromagnet.

In operation, the energization of electromagnet 6 will cause it to vibrate vibratable element 9 whereupon pawl 11 will intermittently engage disc 3 and move it in one direction, the energization of electromagnet 7 will cause it to vibrate vibratable element 10 whereupon pawl 12 will intermittently engaged disc 3 and move it in the opposite direction; and at the energization of either electromagnet some of the magnetic flux generated thereby will permeate support 1 and exert magnetic attraction on rotatable element 2 and dampen it to provide a stabilizing action simultaneously with the vibration of either vibratable element by its respective electromagnet.

It will be observed that the vibratable elements 9 and 10 are parallel with the longitudinally extensive rotatable element 2 and adapted to vibrate toward and away therefrom, and that each electromagnet is positioned intermediate the longitudinally extensive rotatable element 2 and its respective vibratable element.

It will be understood that the support 1 and the cores of the electromagnets 6 and 7 may be made in one piece in the form of a cross or part thereof, and that various modifications may be made in the construction and arrangement of parts without departing from the spirit of the invention as claimed.

I claim:

1. An electro-mechanical device comprising a magnetizable support having a bearing, an electromagnet secured to the magnetizable support, a magnetizable shaft in the bearing adapted to be magnetized by the magnetic flux from the magnetizable support upon the energization of the electromagnet whereby the said magnetic flux will exert a magnetic drag on the magnetizable shaft, and an arm secured to the magnetizable support adapted to be actuated by the electromagnet to actuate the shaft.

2. An electro-mechanical device comprising a magnetizable support having a bearing, a magnetizable shaft in the bearing, a substantially U-shaped bracket structure fastened at its mid-portion to the magnetizable support, each arm of the bracket structure being adapted to engage and rotate the magnetizable shaft, a first electromagnet secured to the magnetizable support adapted to actuate one arm of the bracket structure whereby it will rotate the shaft, and a second electromagnet secured to the magnetizable support adapted to actuate the other arm of the bracket structure whereby it will rotate the shaft.

3. An electro-mechanical device comprising a magnetizable support having a bearing, a magnetizable shaft in the bearing, a substantially U-shaped bracket structure fastened at its mid-portion to the magnetizable support, each arm of the bracket structure being adapted to engage and rotate the magnetizable shaft, a first electromagnet secured to the magnetizable support adapted to actuate one arm of the bracket structure whereby it will rotate the shaft, a second electromagnet secured to the magnetizable support adapted to actuate the other arm of the bracket structure whereby it will rotate the shaft, a loop formed in the substantially U-shaped bracket structure, one end of the loop being integral with the mid-portion secured to the magnetizable support and the other end being integral with an arm of the bracket structure, and adjustable means bearing against a part of the loop adapted to vary the spacing between the said arm and the electromagnet adapted to actuate the said arm.

4. Means for actuating a rotatable element comprising a magnetizable support, a bearing in the magnetizable support, a magnetic rotatable element adapted to rotate in the bearing, a vibratable element having one end secured to the magnetizable support and the other end thereof being adapted to actuate the magnetic rotatable element, and an electromagnet having one pole thereof secured to the magnetizable support and the other pole thereof being adapted to actuate the vibratable element whereby in response to the energization of the electromagnet the major portion of the magnetic flux generated by the electromagnet will be shunted through the magnetic circuit comprising the magnetizable support, vibratable element, and core of the electromagnet, and a minor portion of the said magnetic flux flowing from the pole of the electromagnet secured to the magnetizable support will exert a magnetic drag on the magnetic rotatable element simultaneously with the actuation of the magnetic rotatable element by the vibratable element.

5. Means for actuating a rotatable element comprising a magnetizable support, a bearing in the magnetizable support, a magnetic rotatable element adapted to rotate in the bearing, a vibratable element having one end secured to the magnetizable support and the other end thereof being adapted to actuate the magnetic rotatable element, an electromagnet having one pole thereof secured to the magnetizable support and the other pole thereof being adapted to actuate the vibratable element whereby in response to the energization of the electromagnet the major portion of the magnetic flux generated by the electromagnet will be shunted through the magnetic circuit comprising the magnetizable support, vibratable element, and core of the electromagnet, and a minor portion of the said magnetic flux flowing from the pole of the electromagnet secured to the magnetizable support will exert a magnetic drag on the magnetic rotatable element simultaneously with the actuation of the magnetic rotatable element by the vibratable element, a loop connecting the magnetizable support and the vibratable element, and means bearing against a side of the loop adapted to be adjusted to vary the spacing between the free pole of the electromagnet and the vibratable element actuated thereby.

6. Method of actuating a shaft consisting in generating magnetic flux, causing the magnetic flux to actuate a magnetizable armature whereby the armature will actuate a magnetizable shaft, and diverting part of the magnetic flux through a bearing of magnetic material containing the magnetizable shaft to magnetize and dampen the magnetizable shaft simultaneously with the actuation of the magnetizable armature.

References Cited in the file of this patent

UNITED STATES PATENTS

| | | |
|---|---|---|
| 452,429 | Gray | May 19, 1891 |
| 506,209 | Davis | Oct. 10, 1893 |
| 1,816,102 | Waters | July 28, 1931 |
| 1,940,552 | Le Page | Dec. 19, 1933 |
| 1,952,341 | Ude | Mar. 27, 1934 |
| 2,606,222 | Clifford | Aug. 5, 1952 |
| 2,650,312 | Abrahamson | Aug. 25, 1953 |

FOREIGN PATENTS

| | | |
|---|---|---|
| 257,492 | Germany | Mar. 8, 1913 |
| 359,876 | France | Feb. 5, 1906 |
| 575,386 | Germany | Jan. 14, 1931 |
| 607,583 | Great Britain | Sept. 1, 1948 |
| 1,003,268 | France | Nov. 14, 1951 |